United States Patent [19]
van Leijenhorst et al.

[11] Patent Number: 4,691,586
[45] Date of Patent: Sep. 8, 1987

[54] FINE-ADJUSTING DEVICE FOR ACCURATE POSITIONING AN ADJUSTING ELEMENT

[75] Inventors: Harro M. van Leijenhorst, Zoetermeer; Jan F. Suringh, Rotterdam, both of Netherlands

[73] Assignee: Staat der Nederlanden (Staatsbedrijf der Posterijen, Telegrafie en Telfonie), The Hague, Netherlands

[21] Appl. No.: 835,893

[22] Filed: Mar. 4, 1986

[30] Foreign Application Priority Data

Mar. 5, 1985 [NL] Netherlands ............ 8500615

[51] Int. Cl.$^4$ ............................................. G05G 11/00
[52] U.S. Cl. .................................... 74/479; 248/251; 269/58
[58] Field of Search ............... 74/479, 5 F; 248/251, 248/274; 269/58, 71

[56] References Cited

U.S. PATENT DOCUMENTS

| 3,700,289 | 10/1972 | Bilinski et al. | 74/5 F X |
| 3,748,912 | 7/1973 | Hildebrand | 74/5 F |
| 3,856,366 | 12/1974 | Weisbord et al. | 74/5 F X |
| 4,491,294 | 1/1985 | Blume et al. | 74/479 X |
| 4,506,154 | 3/1985 | Scire | 269/58 X |

FOREIGN PATENT DOCUMENTS

| 100781 | 2/1984 | European Pat. Off. | |
| 134268 | 3/1985 | European Pat. Off. | 269/58 |
| 57-13301 | 1/1982 | Japan | |
| 59-64240 | 4/1984 | Japan | |
| 2035564 | 6/1980 | United Kingdom | |
| 2131908 | 6/1984 | United Kingdom | 74/479 |

Primary Examiner—Richard J. Scanlan, Jr.
Attorney, Agent, or Firm—Frishauf, Holtz, Goodman & Woodward

[57] ABSTRACT

The invention relates to a fine-adjusting device made of a metal plate (30,40), in which slots, arranged in pairs and ending at both ends in holes, form at least a bar parallelogram (30-33; 40-43) with play-free flexible hinges (34-37, 44-47) as pivots, each bar parallelogram being provided with a fixed bar (30;40), a shifting bar (33;43) parallel to this fixed bar and two pivoting bars (31,32; 41,42). For a combined X-Y adjustment two shifting bars (33,43), which are at right angles to each other, have to be connected by coupling bars (50,51), which each (51,50, respectively) move with the one shifting bar (33,43, respectively) in the one direction (X,Y, respectively), and pivot with regard to the one shifting bar (33,43 respectively) in the other direction (Y,X, respectively) in the same way as the pivoting bars (41,42 and 31,32, respectively) connected to the other shifting bar (43,33, respectively), a stabilizing bar (60) being parallel to one (51) of the coupling bars and forming with that coupling bar a bar parallelogram together with two other bars (57,63), one (63) of which is rigidly connected to the shifting bar (33), together with which the latter coupling bar (51) moves.

7 Claims, 11 Drawing Figures

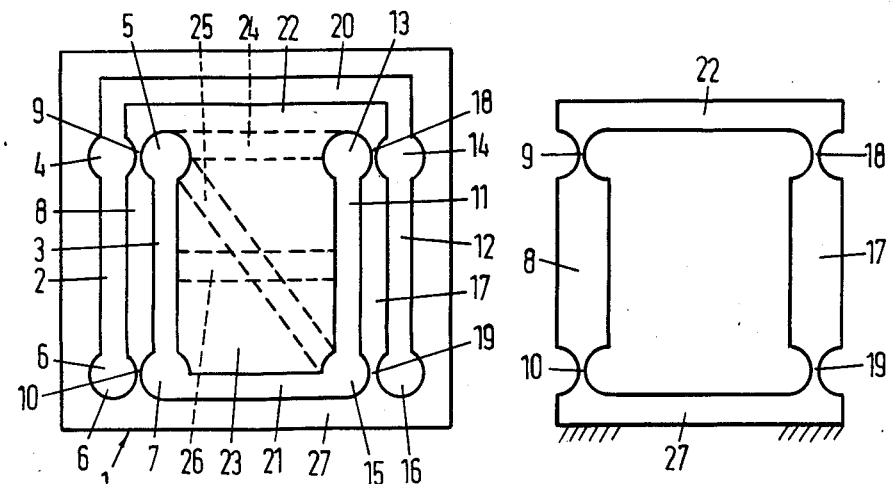
FIG. 1
FIG. 2
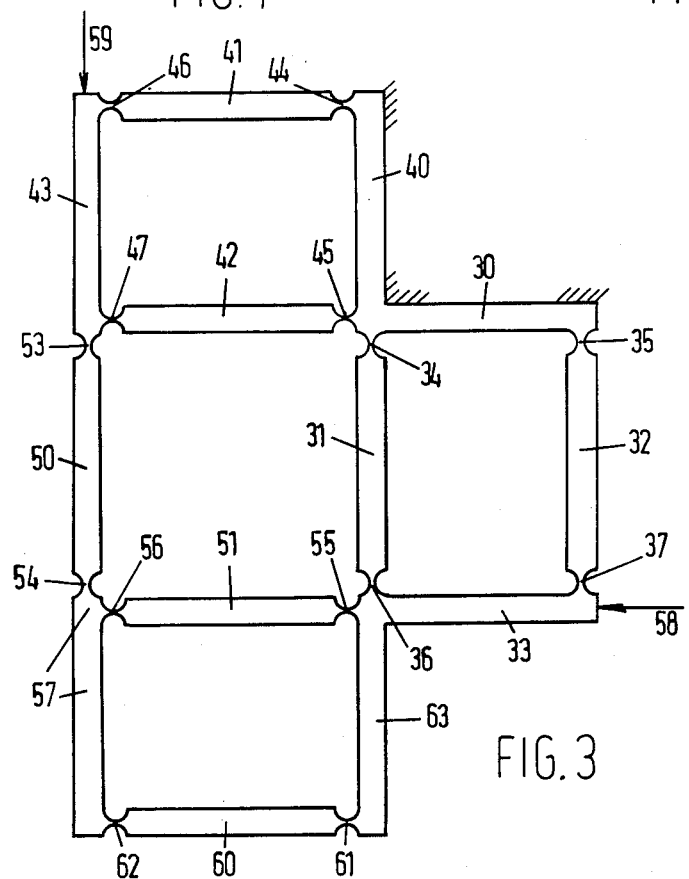
FIG. 3

FINE-ADJUSTING DEVICE FOR ACCURATE POSITIONING AN ADJUSTING ELEMENT

The invention relates to a fine-adjusting device for positioning, with the utmost accuracy, two elements with respect to each other, particularly two wire or fibre-shaped elements, such as optical fibres, which are to be connected endways. Before such signal-carrying elements are actually connected, e.g. by jointing, the transition losses at the junction can be minimized by aligning these elements as exactly as possible. This can be checked by optical means, but a more obvious method consists in measuring the signal flow.

It is the object of the invention to provide a fine-adjusting device by means of which two elements placed end to end but not yet connected can be transversely displaced with respect to one another while a signal is being led through, in such a way that, by measuring the signal strength, the optimum position of one element with respect to the other can be determined and maintained during the final connection of the elements. If there is a fixed reference plane in one direction, e.g. a stationary, flat base surface, positioning is only necessary in one direction, at right angles to that reference plane. In many cases, however, an adjusting facility will be needed for the X direction as well as the Y direction.

Consequently, such a fine-adjusting device must be capable of an extremely accurate positioning over very short distances, and of movements to and fro in the direction of displacement without play. The latter requirement, in particular, causes several components frequently used in displacement devices to be unsuitable for the object in view. Thus, constructions comprising the usual sliding guide or similar parts consisting of members that slide or turn with respect to each other are frequently subject to an inadmissible play.

Similar inconveniences attach to devices based on displacement by screws.

A fine-adjusting device can be obtained with a metal plate having four parallel slots arranged in pairs and each ending in a hole with a diameter that exceeds the width of the slot, the centres of the four holes at one end of the slots, as well as those at the other end, lying on a straight line and the pairs of adjacent holes at either end of the bar formed by the remaining plate material between two slots forming a flexible hinge, that slot of one pair of slots which is nearer to the other pair of slots being connected via a first connecting slot to the nearby slot of the other pair and a second connecting slot, which does not intersect the first connecting slot, connecting the far-off slots, in such a manner that a parallelogram of bars is formed, comprising two pivoting bars, each formed by two slots arranged in pairs and ending in flexible hinges, a shifting bar connecting the pivoting bars and separated from the plate by the two connecting slots, and a fixed bar which, incorporated in the plate, can be regarded as fixed mass. These measures have enabled the production of a fine-adjusting device that can be operated from the fixed mass and allows a fine adjustment in one direction without any play between moving parts, the hinges being, as regards their centres of rotation, accurately defined elastic hinges.

The point to be displaced by the fine-adjusting device may be situated on the shifting bar or on one of the pivoting bars; on the other hand, each of these bars can be used to receive the movement imparted by the operating control.

It is an object of the invention to obtain an adjustment in two directions. In accordance with the invention this can be achieved with advantage, in a further embodiment of the invention, by providing the plate with a second set of four parallel slots and a second pair of connecting slots forming, in addition to the first bar parallelogram, a second bar parallelogram, the two pivoting bars of which are at right angles to the first two pivoting bars, a further pair of slots, which parallels said first two pivoting bars and has, at either end, two holes which form a flexible hinge and the centres of which lie on a straight line with a set of four holes of said first two pivoting bars, forming a first coupling bar, which is hinged to the shifting bar of said second bar parallelogram, on the one hand, and to an adjusting member connected via a second coupling bar to the shifting bar of the first bar parallelogram, on the other hand, said second coupling bar being formed by a pair of slots which parallels said second two pivoting bars and has, at either end, two holes which form a flexible hinge and the centres of which lie on a straight line with those of a set of four holes of said second two pivoting bars, a stabilizing bar forming, by an appropriate choice of slots and holes, with said first and second coupling bars a third bar parallelogram. These measures have resulted in the formation of two bar parallelograms of which the shifting bars are at right angles to each other and which thus allow an X-adjustment as well as a Y-adjustment from the fixed mass. The shifting bars of the two parallelograms are coupled by the two coupling bars which, each with an adjacent pivoting bar, form a further bar parallelogram, the coupling member between the two coupling bars being the adjusting member. Because, due to inherent properties of the flexure hinge construction, this member is connected by flexure hinges to both coupling bars, it actually constitutes a fifth bar. This results in an additional degree of freedom, which is eliminated by providing the third bar parallelogram including the stabilizing bar.

The above-mentioned fine-adjusting devices are based on parallelogram shifting; this means that, on the one hand, the shifting-bar movement is parallel to the imaginary or non-imaginary fixed-mass bar, but also at right angles to it, due to the movement of the pivoting bars. In some cases—with a suitable choice of the pivoting-bar length and comparatively small main displacements—this latter movement will be so small that it may be ignored or—if the fine-adjustments are not tied to measures—are of little or no importance. If this is not the case, the movement at right angles to the shifting bar will have to be balanced. According to the invention, this is achieved, while retaining the aforesaid advantages, by providing appropriate slots and holes to form a further pair of pivoting bars, which parallels the first two pivoting bars, is as long as these pivoting bars, has, at either end, flexible hinges lying on lines drawn through the flexible hinges at either end of the first two pivoting bars, and is hinged, on the one hand, to the first shifting bar connecting said first two pivoting bars and, on the other hand, to a second shifting bar formed by providing at least one further connecting slot, which does not intersect the first nor the second connecting slot and connects two slots, one of which helps to form one of said further two pivoting bars, the other forming the other pivoting bar of said further pair, a control device provided for the purpose effecting, when the first shifting bar is displaced over a certain distance by the rotation of the pivoting bars of the first pair through certain angle relative to the fixed bar, a displacement of the second shifting bar by a rotation of the pivoting bars of said further pair through the same angle relative to the first shifting bar over the double distance from the initial position. By these measures, the displacement of the first shifting bar at right angles to its longitudinal movement is balanced by a contrary displacement of the second shifting bar, which is effected in a relatively simple manner by attaching the second shifting bar to the first by means of pivoting bars of the same length as the pivoting bars bearing the first shifting bar. Thus, to obtain the compensation aimed at, it will suffice for the two pivoting bars to be rotated through the same angle as the first pair of pivoting bars, due to which the displacement of the second shifting bar caused by the displacement of the first shifting bar as a result of the pivoting movement of the first pair of pivoting bars—at least in a direction of right angles to the longitudinal direction of the second shifting bar—is cancelled by the equal but contrary displacement of the second shifting bar as a result of the pivoting action of the second pair of pivoting bars.

The above-mentioned further pair of pivoting bars can be formed in a simple, advantageous and space-saving manner, if, in accordance with a further embodiment of the invention, a slot having a hole at either end and contributing to form a pivoting bar of the first pair of pivoting bars also helps to form a pivoting bar of the further pair of pivoting bars.

The control device can be designed in many ways. In view of the construction and formation of the bar parallelograms, a particular reference is given to a control device provided with a lever the pivoting action of which is controlled by a coupling bar between that lever and the first bar parallelogram and which is connected via a second coupling bar to the second bar parallelogram, in such a manner that the displacement imparted to the first shifting bar is transmitted in a ratio of 1 to 2 to the second shifting bar. These measures allow the control device to be located and formed in the same plate in which the bar parallelograms have been formed. In a first embodiment of the control device for a fine-adjusting device according to the invention this idea has been further developed in such a manner that the fulcrum of the lever is connected to the fixed mass, the first coupling bar is hinged, on the one hand, to the lever at a distance of once the pivoting-bar length from the fulcrum, and, on the other hand, to the hinge point of the first shifting bar and the contiguous pivoting bar, and the second coupling bar is hinged, on the one hand, to the lever at a distance of twice the pivoting-bar length from the fulcrum and, on the other hand, to the hinge point of the second shifting bar and the contiguous aforementioned pivoting bar, the first and the second coupling bar being equally long. Preference is given, however, to a construction in which the fulcrum of the lever is fixedly connected to the first shifting bar, the lever is an equal-armed first-class lever, the first coupling bar is hinged, on the one hand, to the middle of a pivoting bar of the first bar parallelogram and, on the other hand, to one end of the lever, and the second coupling bar is hinged on one hand to the middle of a pivoting bar of the second bar parallelogram and, on the other hand, to the other end of the lever, the lengths of the first and the second coupling bar being equal, as in the case a more compact construction can be achieved than in the first embodiment.

All the fine-adjusting devices with control devices discussed in the preceding paragraph imply a movement imparted in one direction. Of course, such devices can also be combined into an X-Y fine-adjusting device, e.g. in such a manner that the fixed bar of a second bar parallelogram is connected at right angles to the second shifting bar and that this bar parallelogram is further provided with a first pair of pivoting bars, a first shifting bar, a second pair of pivoting bars, a second shifting bar, and a control device, the arrangement being analogous to that of the first bar parallelogram. In this case, however, the adjusting member of one displacement is located on that part of the fine-adjusting device which is displaced by the other adjusting member. Therefore, in accordance with a further embodiment of the invention, the arrangement preferably comprises an X-adjusting bar parallelogram the shifting bar of which bears a fine-adjusting device with a control lever and two bar parallelograms, the pivoting bars of which are at right angles to the pivoting bars of the X-adjusting bar parallelogram, a Y-adjusting bar parallelogram the shifting bar of which bears a fine-adjusting device with a control lever and two bar parallelograms, the pivoting bars of which are at right angles to the pivoting bars of the Y-adjusting bar parallelogram, which are at right angles to the pivoting bars of the X-adjusting bar parallelogramm, and an adjusting element which is fixedly connected to both the second shifting bar of the fine-adjusting device borne by the X-adjusting bar parallelogram and to the second shifting bar of the fine-adjusting device borne by the Y-adjusting bar parallelogram. Due to these measures, the X-adjustment as well as the Y-adjustment can be controlled independently of each other from the fixed mass, the linearity of displacement being retained in both the X and the Y direction.

The displacement can be introduced by applying a force to e.g. one of the pivoting bars or the shifting bar of the first bar parallelogram. In order to optimize the introduced displacement with respect to the displacement to be produced, it is preferable, in accordance with a further embodiment of the invention, that the adjusting member is moved by an adjusting force exerted near the flexure hinge between a pivoting bar and the shifting bar of the first bar parallelogram for the X-adjustment and the Y-adjustment.

SUMMARY OF THE INVENTION

The fine adjusting device for positioning a workpiece in two dimensions defined by a plane surface of a metal plate, in accordance with the invention, is capable of having its principal structure formed from a metal plate having apertures cut out therein, at least part of which apertures are slots, and accordigly comprises a slotted and apertured metal plate. In that device according to the invention, a first four-hinged frame is formed of a first pair of parallel flat bars having the same length measured in a straight line between extremities of such a bar, both bars being reduced in width at both extremities by semi-circular cutouts oppositely located on opposite bar sides forming flexure hinges connecting the first pair of flat bars to a second pair of flat bars, which are likewise of equal length measured between the flexure hinge connections. A first bar of the of the second pair is in fixed position and a second bar of that second pair has at one end a first rigid end extension at right angles to the bar extending towards the first bar of the second pair. The latter has a first right angled extension extending towards, but short of, the right angled extension of the second bar of the second pair and also has a second right angled extension extending in the same direction as the first, at a location such as to leave a first variable slot between the end of the second extension and the adjacent end of the second bar of the second pair. That first variable slot extends parallel to the second right angled extension of the first bar of the second pair to the vicinity of a hinge connecting the first bar of the second pair to the second bar of the first pair. The latter also has a straight ending extension. An aperture is formed internally of the first hinged frame, which aperture includes four of the semi-circular cutouts located on facing sides of the bars of the first pair.

There is a second four-hinged frame formed of first and second pairs of bars, the first pair of bars being straight, parallel and of equal length between hinges of the second frame connecting the firsr pair of bars to the second pair of that frame. A first bar of the first pair in the second frame is constituted by the first rigit extension of the first bar of the second pair of the first frame, for being rigidly connected to the latter bar. The bars of the second pair in the second frame are constituted so as to maintain pairs of flexure hinges of the second frame at equal distance separating the hinges of each hinged pair. Each of these hinged pairs is composed of one hinge connecting to each of the bars of the first pair of the second frame, these hinges being formed by semi-circular cutouts of both sides of end extensions of the bars of the second pair in the second frame. The second bar of the first pair in the second frame has a right angled extension extending away from the first bar of the same pair, at the end of the second bar of the first pair in the second frame which is nearer to the previously mentioned straight extension of the first bar of the second pair of the first frame, leaving an opening of a second variable slot between the right angled extension of the second bar of the first pair of the second frame and the straight end extension of the first bar of the second pair of the first frame. The second variable slot runs along the straight end extension of the first bar of the second pair in the first frame to a semi-circular cutout of a flexure hinge connecting the first bar of the first pair in the second frame to a bar of the second pair in the second frame.

There is also a third four-hinged frame having a first pair of flat bars which are straight, parallel and of equal length between hinges of the third frame. The first bar of the first pair in the third frame is constituted by the previously mentioned right angled end extension of the second bar of the second pair in the first frame, while the second bar of that first pair in the third frame is equipped with a holder rigidly attached thereto for holding an article to be positioned. The third frame has a second pair of flat bars constituted so as to maintain pairs of hinges of the third frame at equal distances separating the hinges of each pair, each pair being composed of one hinge connecting to each of the bars of the first pair of the frame and being formed by semi-circular cutouts on both sides of end extensions of the bars of the second pair of the frame.

In the device there is also a coupling link flat bar having flexure hinges at its ends which each have semi-circular cutouts on both sides of the hinged portion of the bar. A first of these hinges connects the link bar to the previously mentioned right angled end extension of the second bar of the first pair in the second frame, while a second of these hinges connects the link bar to a right angled extension of the second bar of the first pair of the third frame. The link bar is of a length equal to the length of a bar of the first pair in the first frane.

Finally, means are provided for independently varying the respective widths of the first and second variable width slots, including first adjusting means mounted on the second right angled extension of the first bar of the second pair in the first frame and second adjusting means mounted on the previously mentioned straight extension of the first bar of the second pair in the first frame. It then follows that the holder with which the second bar of the first pair of the third frame is equipped may be positioned in two dimensions in a plane by actuation of a first and second adjustment means.

A useful additional feature of the device just described is provided when the holder for the article to be positioned is attached to the same end of the second bar of the first pair in the third frame at which the right angled extension is provided for the bar for holding a connecting hinge for one end of the link bar.

Another useful feature of the device summarized at length above is for the flat link bar and all the flat bars of the first, second and third frames to be straight and to be bounded on one side for at least the predominant part of the length of the bar by a deformable slot, these deformable slots including the first and second variable width slots.

Another set of features which can usefully be embodied in the device summarized at some length above includes the feature that one of the bars of the second pair in the second frame which is connected by a hinge to the end of the first angled extension of the first bar of the second pair in the first frame, which extension constitutes the first bar of the first pair of the second frame, and also that one of the second pair of the flat bars in the third frame which is connected by a hinge to the end of the right angled extension of the second bar of the first pair in the first frame which extension constitutes the first bar of the first pair of bars in the third frame, are both of bracket shape for providing an aperture rather than a slot between them. In that case, the holder for the article to be positioned is mounted on a right angled end extension of the second bar of the first pair in the third frame which extends into that aperture. Preferably, in an embodiment having the last-mentioned set of additionl features, the link bar and all other bars of the several frames except the bracket shaped bars are straight bars.

In order to obtain small produced displacements with comparatively large introduced displacements, it is preferable, in accordance with a further embodiment of the invention, that the point of application of the adjusting force is located in the fulcrum of an unequal-armed first-class lever in one of the variable-width slats, supported at either end by an element which can be positioned relative to the fixed mass. Moreover, this arrangement provides a coarse and a fine-adjusting facility; a coarse adjustment is effected by moving the short-arm end of the lever and keeping the long-arm end in place and, conversely, a fine adjustment is obtained by actuating the long-arm and blocking the short-arm end.

In accordance with a further embodiment of the invention, coarse and fine-adjustment features can also be provided by an arrangement in which the adjusting force is applied to the point of application via a coarse-adjusting control which is coupled to this point and which can be displaced by screwing in a one-armed lever through a threaded hole near the fulcrum formed by a flexure hinge which connects the lever to the fixed mass, whereas a fine-adjusting control, which can be displaced by screwing with respect to the fixed mass, acts on the lever near its free end. These measures provide, in a particularly advantageous manner, a compact construction, in which the coarse-adjusting control acts direct on the displacement introduction point. Turning the coarse-adjusting control screw relative to the lever causes a coarse adjustment to be introduced, because the lever is kept in place by the fine-adjusting control, whereas turning the fine-adjusting control screw relative to the fixed mass causes the lever to move, taking along the screwed-in coarse-adjusting control, and thus imparting a fine-adjusting displacement to it.

In order to ensure that the lever always bears against the fine-adjusting control, a spring can be provided, in accordance with a further embodiment of the invention, which pushes the lever towards the fine-adjusting knob. The introduction of displacements in the bar parallelograms causes reacting forces in the flexure hinges, which tend to resume their neutral mid-position. In order to neutralize this effect, particularly in constructions comprising a plurality of such flexure hinges, it is preferable, in accordance with a further embodiment of the invention, that a negative-stiffness spring is provided near the point of application of the adjusting force, in such a manner that the elastic forces produced in the flexible hinges by the displacement of the point of application is, at least partly, balanced by the elastic force produced in the negative-stiffness spring by the same displacement of the point of application. By such a use of a negative-stiffness spring—i.e. a spring having, in its central position, an unstable equilibrium and moving, once displaced from that position, to its utmost position with a force directly proportional to the deviation—elastic forces produced in the fine-adjusting device can be reduced or balanced, so that a nearly or entirely forceless displacement can be achieved. This enhances the accuracy of the fine-adjusting device, since no increasing force, as considered from the neatral mid-position of the flexible hinges, need to be exerted on the displacement introduction means to obtain a left-hand or a right-hand displacement. A suitable choice of the elastic characteristic of the negative-stiffness spring makes it possible to obtain a forceless movement, because in that case the forces produced in the flexure hinges can be balanced by the contrary force produced in the negative-stiffness spring. The elastic characteristic of the negative-stiffness spring can be determined and fixed with utmost accuracy if, in accordance with a further preferred embodiment of the invention, the negative-stiffness spring is a leaf spring clamped-in by its ends between two fastening points separated by a distance shorter than its length and also clamped-in in the middle, which clamped-in middle is in unstable equilibrium half-way its moving range, on the connecting line between the two fastening points and is the point of application for the adjusting force. In such a construction with forceless movement, the flexure hinges can be loaded symmetrically, thus having an optimal range, i.e. they can be used from one utmost position to the other.

Improvements described in the preceeding paragraph are most effectively applicable to a type of embodiment of the invention in which the slotted and aperture metal plate has a fixed portion including a first corner and has first and second extensions directed at right angles to each other away from the first corner and towards the second and third corners, a holder being attached near a fourth corner of the plate for the workpiece to be positioned.

In this type of embodiment, a first four-hinged frame is defined by stamping out slots in the plate as well as circular and semi-circular cutouts for forming flexure hinges of the first and other frames of the device, the hinges being formed by virtue of back-to-back proximity of semi-circular cutout portions. The first frame includes first and second flat bars of a first pair of bars which are straight, of equal length and parallel to each other, both having a flexure hinge at both ends formed by semi-circular cutouts back-to-back on opposite sides at the ends of the bar. The first frame also has first and second flat bars of bracket shape connected to the bars of the first pair by the hinges and having the same length between the hinges which connect each bracket-shape bar to bars of the first pair. The first bar of the second pair is solidary with the fixed portion of the plate which includes the first plate corner. The second bar of the second pair is solidary with a portion of the plate separated from the second corner extension by a first variable width slot. The second bar of the second pair also has an extension which is re-entrant into the first variable width slot. A second four-hinged frame is defined by stamping the plate. It has first and second flat bars of a first pair connected by flexure hinges to first and second flat bars of a second pair. The first bar of the first pair is straight, having hinges extending from both ends. It borders on a second variable width slot and has an extension which is re-entrant into that second variable width slot, that extension being separated by that slot from the third-corner extension of the fixed portion of plate. The first bar of the second pair in the second frame is solidary with that fixed portion of the plate and has first and second flexure hinges on one side of the bar respectively connecting it to the first and second bars of the first pair in the second frame and defining the length of the first bar of the second pair. The second bar of the second pair has the same length between hinges connecting it to the bars of the first pair as the distance between the hinges on the previously mentioned side of the first bar of the second pair. The second bar of the first pair is bracket shaped to make room for the first bars of the first and second pairs in the first frame.

There is also a third four-hinged frame in the mirror image of the second four-hinged frame. It has a first bar of a first pair which is straight and of the same length as the first bar of the first pair in the second frame. It has a second bar of the first pair which is bracket shaped to make room for the first bar of the first pair and the second bar of the second pair all of the first frame. The third four-hinged frame has first and second bars of a second pair connected by hinges to the bars of the first pair of the third frame. The second of these bars of the second pair of the third frame carries the holder for the workpiece and the first bar of the second pair of the third frame is solidary with the second bar of the second pair of the first frame and the extensions thereof in the second variable width gap.

Here again, there is a coupling link flat bar having hinges extending from both ends and of the same length as the first bar of the first pair of the first frame. In this case, however, it is hinged at its ends to respective S-shaped extensions of the second bar of the second frame and of the second bar of the second pair in the third frame. These S-shaped extensions are in mirror image of respective portions of the bracket-shaped first and second bars of the second pair in the first frame.

Finally, means are provided for independently varying respective widths of the first and second variable width slots, including first adjusting means on the third corner extension of the plate and second adjusting means.

In order to adapt the device basically just described to the use of a negative stiffness leaf spring for the reasons previously stated, the re-entrant extensions into the first and second variable width slots extend to an end near the lengthwise middle of the slot and at that end they have a rotation-permitting attachment to one of the adjusting means which is of a screw type and has an actuation head beyond the other side of the slot. A negative-stiffness leaf spring is fastened in its head portion to the end of the extension just mentioned and anchored at both end on the other side of the slot. Auxiliary fine adjusting means of a screw type are provided at an end of a lever arm hinged at its other end to one of the extensions of the fixed portions of the plate bordering on the respective slot for exerting a force on the actuation head near the other end of the lever.

BRIEF DESCRIPTION OF THE DRAWINGS

The fine-adjusting device according to the invention will now be described and explained in more detail, reference being had to the examples of embodiment shown in the drawing. In this drawing FIG. 1 shows a bar parallelogram with flexible hinges formed by slots and holes in a plate;

FIG. 2 shows the bar parallelogram of FIG. 1, in which superfluous parts of the plate have been taken away;

FIG. 3 shows an X-Y fine-adjusting device in its elementary form;

Description of the Illustrated Embodiments

Figure 4:
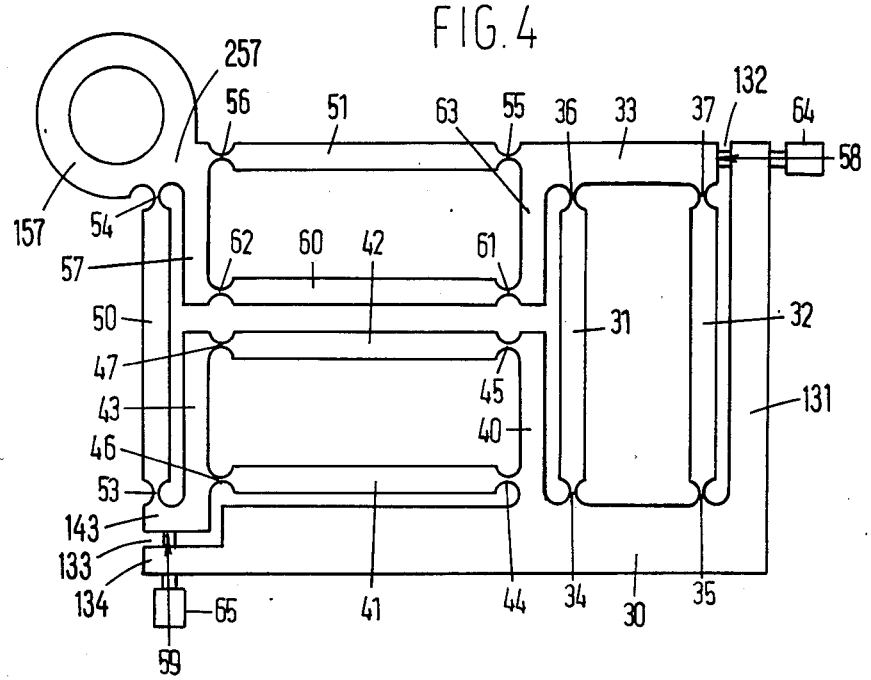
FIG. 4 shows a design variant of the X-Y fine-adjusting device.

FIG. 1 represents a plate 1 in which a bar 8 with flexure hinges 9 and 10 at its ends is formed by providing two slots 2, 3 and four holes 4-7. In an analogous way, a bar 17 with flexure hinges 18 and 19 is formed by providing slots 11, 12 and holes 13-16. Bar 17 is parallel to and as long as the bar 8, and the centres of either set of holes 4, 5, 13, 14 and 6, 7, 15, 16 lie on a straight line. In order to allow the bars 8 and 17 to pivot relative to the plate 1, they must be cut loose from plate 1 at one end. In FIG. 1 this has been done by providing a connecting slot 20 between holes 4 and 14 and a connecting slot 21 between holes 7 and 15. As a consequence, the part connecting flexure hinges 9 and 18, further referred to as shifting bar 22, together with plate part 23 limited by holes 5, 7, 13 and 15 and slots 3, 11 and 21, can be displaced with respect to the rest of plate 1, notably in the manner of a parallelogram parallel to the line connecting the flexure hinges 10 and 19.

It should be noticed that the connecting slots can be arranged in many other ways. To illustrate this, FIG. 1 shows, in dashed line, three alternative slots 24, 25 and 26 for connecting slot 21.

FIG. 2 shows the bar parallelogram of FIG. 1 in its most elementary form, i.e. all dispensable parts of the original plate 1 have been cut away, so that the figure shows a shifting bar 22 which is connected, on the one hand, by a flexible hinge 9, a pivoting bar 8 and a flexible hinge 10, and, on the other hand, by a flexure hinge 18, a pivoting bar 17 and a flexible hinge 19 to a fixed bar 27, which can be regarded as fixed mass. If a push is given sideways to pivoting bar 8 or 17, or endways to shifting bar 22, the latter will move, without play, in a direction parallel to fixed bar 27. The kind of parallelogram shown in FIG. 2 may be consisely described as a four-hinged frame.

In FIG. 3, two four-hinged frames according to FIG. 2 are combined to form an X-Y adjusting device in which the X as well as the Y-coordinate can be adjusted from the fixed mass. The X-frame is formed by fixed bar 30, pivoting bars 31 and 32 and shifting bar 33, which bars are coupled by flexure hinges 34-37, and the Y-frame by fixed bar 40, pivoting bars 41 and 42, shifting bar 43 and flexure hinges 44-47, fixed bar 40 forming part of the same fixed mass or frame as fixed bar 30, to which it is at right angles.

The X and Y-frames are connected by two coupling bars 50 and 51. Coupling bar 50 is parallel to and as long as the pivoting bars 31 and 32. It is connected by a flexure hinge 53 to the shifting bar 43, the centres of the holes forming the hinge 53 lying on a straight line with the centres of the holes forming the hinges 34 and 35. At its other end, remote from hinge 53, coupling bar 50 has a flexure hinge 54 formed by holes the centres of which, due to the location and length of coupling 50 lie on a straight line with the centres of the holes forming the flexure hinges 36 and 37. The coupling bar 51 is parallel to and of the same length as the pivoting bars 41 and 42 and has, at its ends, flexure hinges 55 and 56, the centres of the holes forming these hinges lying on a straight line with the centres of the holes forming the hinges 44 and 45 and 46 and 47, respectively. The coupling bar 51 is connected, at one end, via flexure hinge 55, to the shifting bar 33 and, at the other end, via flexure hinge 56, to an adjusting member 57, which is connected via flexure hinge 54 to coupling bar 50.

If now an X-displacement is introduced in the direction of arrow 58, whereas the point indicated by arrow 59 of the Y-frame is blocked, adjusting member 57 will be displaced by the pivoting movement of bars 31, 32 and 50, while the shifting bar 43 will remain in place. On the other hand, if the X-displacement is blocked, a Y-displacement can be carried out. Of course, it is also possible for the adjusting member 57 to carry out X and Y displacements imparted to it simultaneously or successively.

This fundamental displacement principle is frustrated, however, by effects caused by inherent properties of the flexure hinge construction. As the adjusting member 57 is connected by flexure hinge 54 to coupling or link bar 50 and by flexure hinge 56 to coupling bar 51, this member 57 must be regarded as an additional bar, that is to say, there is not a quadrangle frame 31, 42, 50, 51 but a bar pentagon 31, 42, 50, 51, 57. Consequently, if both the X and Y-displacements are blocked, i.e. if the bars 31 and 42 cannot pivot and can be regarded as fixed mass, there remains a displacement possibility for the adjusting member 57 because the bars 50, 51 and 57 can still move with respect to each other. To overcome this difficulty, another frame is formed by adding a stabilizing bar 60 with flexible hinges 61 and 62 which is parallel to and as long as bars 41, 42 and 51, the centres of the holes forming hinges 61 and 62 lying on a straight line with the centres of the holes forming the hinges 44, 45, 55 and 46, 47, 56, respectively. The stabilization bar 60 is connected, on the one hand, via flexible hinge 62 to the bar-shaped adjusting member 57, which is another bar of the added frame, 57 and on the other hand via flexible hinge 61 to a bar 63, which is parallel to and of the same length as the bar-shaped adjusting member 57 and is fixedly connected to the shifting bar 33. It is obvious that the stabilizing bar 60 can also be placed parallel to the bars 31, 32 and 50. Via the stabilizing bar 60, the adjusting member 57 is coupled to shifting bar 33.

It is also possible to consider the parallelogram 63, 60, 57, 51 as a copending of the parallelogram 40, 41, 43, 42, since the right angle between bars 33 and 63 is just as fixed as the right angle between bars 30 and 40. Then the bar 50 is a link bar to assure that the twin parallelograms deform in the same fashion. This is of importance in understanding FIGS. 4, 5 and 11.

If now both the X and Y-displacements are blocked, the adjusting element 57 will also be immobilized, due to its coupling to shifting bar 33. Nevertheless, separate as well as combined X and Y-movements remain possible, because the additional parallelogram 51, 57, 60, 63 will be deformed in the same manner as the Y-parallelogram 40, 41, 42, 43. In FIG. 3 the X-Y fine-adjusting device has been represented in its most elementary form, which illustrates the mode of operation most clearly. Such a device, however, occupies a considerable space. For practical purposes, therefore, a more compact construction is preferred. Two examples of such compact devices are given in FIGS. 4 and 5. In order to emphasize the similarity of the devices represented in FIGS. 3, 4 and 5, the same reference numbers have been used for corresponding parts.

In the embodiment according to FIG. 4, the displacements indicated by arrows 58 and 59 are introduced by means of screws 64 and 65, respectively, which are mounted respectively on angled and straight extensions 131, 134 of the fixed arm (plate) 30 and bear respectively against ends of the arms 33 and 43 across first and second variable width slots 132 and 133 near the open ends of those slots. For this purpose the arm 43 has an angled extension 143 which also supports the hinge 53 for the bar 50. When a displacement in the direction of arrow 58 is introduced by means of screw 64, bars 31, 32 and 50 will make a pivoting movement, as a result of which parallelogram 51, 57, 60, 63 will be shifted in the direction of arrow 58 with respect to parallelogram 40, 41, 42, 43 without being deformed. The twin parallelogram 40, 41, 42, 43 will likewise not be deformed while bars 31 and 50 pivot to deform parallelogram 31, 51, 50 42. The adjusting element 157 is displaced then in the direction of arrow 58 in accordance with the displacement introduced and is mainly kept in place in the direction of arrow 59. The hinge 54 of the bar 50 is located on a right-angle extension 257 of the bar 57 on which is also mounted the adjusting element 157 which, for example, may hold one optical fiber (not shown) to be aligned with a fixed optical fiber (not shown).

Figure 5:
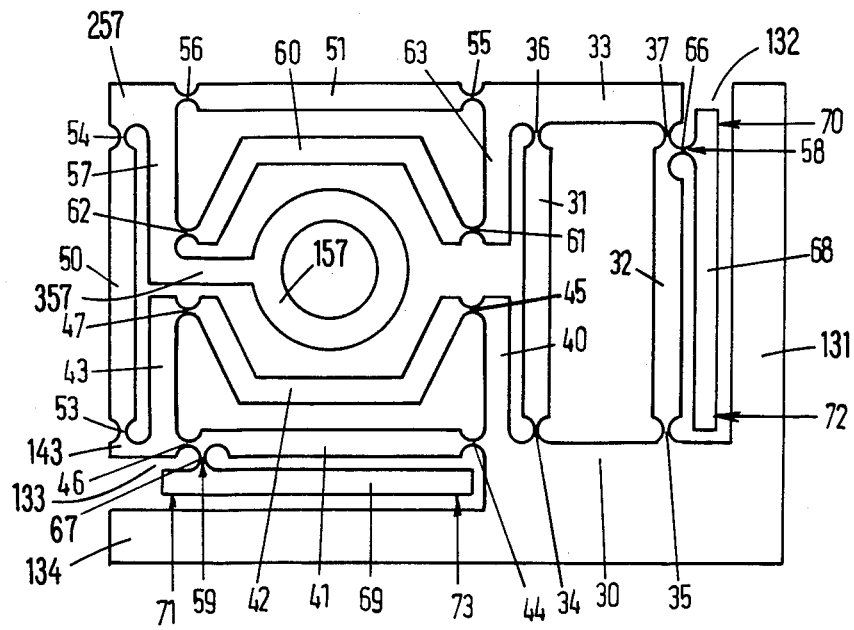
FIG. 5 shows a further design variant of the X-Y fine-adjusting device.

In the embodiment according to FIG. 5, a still more compact construction has been achieved by a suitable location of the flexible hinges and bracket-shaped design of the pivoting bars 42 and 60 and by placing the adjusting element 157 in the center, held on the end of an angled extension 357 of the bar 57. Moreover, in this embodiment, coarse and fine adjustment has been provided for both coordinates. To achieve this, the displacement introduction point indicated by arrows 58 and 59 are flexible hinges 66 and 67, respectively, serving as fulcra for first-class levers 68 and 69, respectively, each having a long and a short arm. Coarse adjustment takes place by introducing a displacement at arrows 70 and 71 to the ends of the respective short arms, the ends of the long arms being left in place. In fine adjustment, the reverse takes place, i.e. the end of the long arm is moved in the direction of arrow 72 and 73, the short arm being left in place.

The above description of the devices represented in FIGS. 1–5 dealt with X and/or Y-displacements, no attention being paid to the displacement perpendicular to the displacement introduced, resulting from the movement of the shifting bar towards the fixed bar caused by the movement of the pivoting bars. In many cases, ignoring this perpendicular movement is permissible, certainly with a suitable choice of the length of the pivoting bars and small movements introduced to these bars. In cases where it is not allowable, use can be made of double bar parallelograms, the principle of which will be explained with the aid of FIG. 6.

Figure 6:
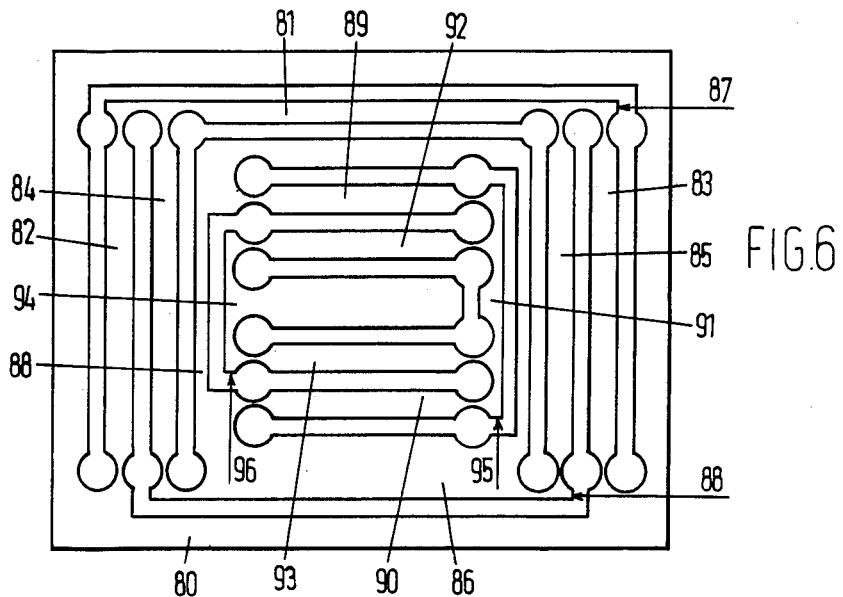
FIG. 6 shows an X-Y fine-adjusting device with double bar parallelograms.

In FIG. 6, the bar parallelogram formed by fixed bar 80, shifting bar 81 and pivoting bars 82 and 83 corresponds to bar parallelogram 27, 22, 8, 17 of FIGS. 1 or 2. A second shifting bar 86 is attached to shifting bar 81 by means of pivoting bars 84 and 85, which are parallel to and as long as pivoting bars 84 and 85, which are parallel to and as long as pivoting bars 82 and 83. If now a displacement is introduced in the direction of arrow 87, shifting bar 81 in FIG. 6 will move to the left and—due to the pivoting movements of bars 82 and 83—a little downward. The "swing" 84, 85, 86, attached to shifting bar 81, will move along with it without being deformed, so that the second shifting bar 86 moves as much to the left and downward as the first shifting bar 81. If now, starting from this displaced position of the second shifting bar in FIG. 6, viewed in the direction of arrow 88, this bar is moved as much to the left as bar 81 had already been displaced, the second shifting bar 86 will move upwards, due to the equal lengths of the bars 82–85, as much as the first shifting bar 81, and with it the second shifting bar 86 had moved downward in the first instance, the overall result being that the second shifting bar 86 will be again at the same level as in its initial position, so that its displacement to the left will be purely linear.

A second double bar parallelogram is provided at right angles to the second shifting bar 86 and consists of a parallelogram based on bar 86, i.e. having a part 88 forming a whole with this bar 86 and being perpendicular to it, two pivoting bars 89 and 90 and a first shifting bar 91, and of a "swing" attached to the first shifting bar 91 formed by two pivoting bars 92 and 93 and a second shifting bar 94. Also in this case, a purely linear displacement of the second shifting bar 94 will be obtained if two equal displacements are introduced as indicated by arrows 95 and 96.

Figure 9:
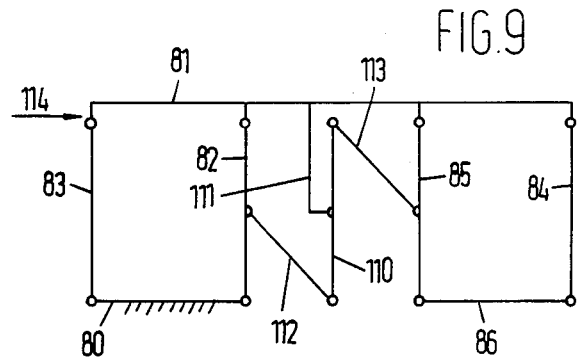
FIG. 9 is a schematic representation of a further linear fine-adjusting device.
Figure 7:
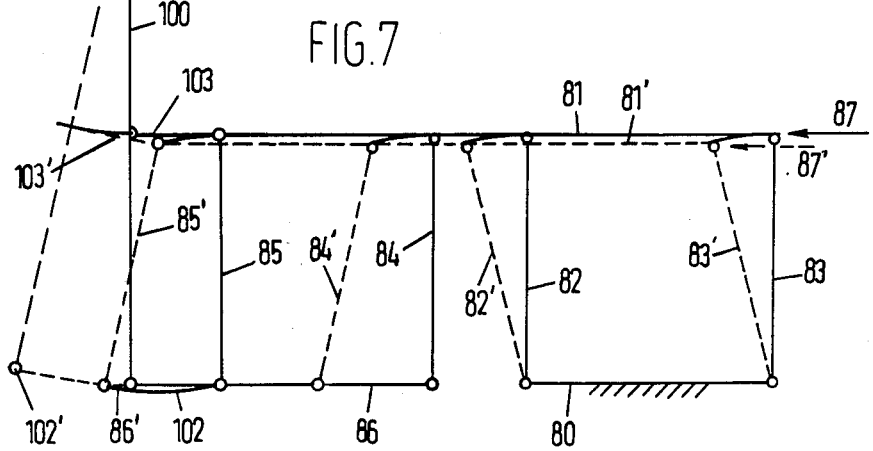
FIG. 7 is a schematic representation of a linear fine-adjusting device.
Figure 8:
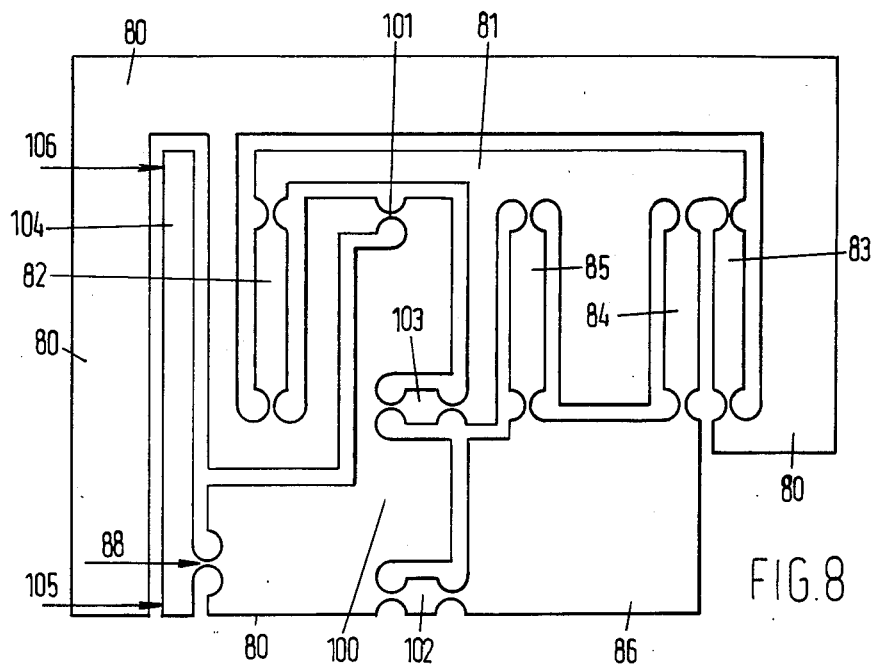
FIG. 8 shows a design variant of the fine-adjusting device according to FIG. 7.

In the foregoing paragraph, two displacements were introduced per double bar parallelogram. Separate introduction of these displacements would mean a serious source of errors, the more so since the point at which the displacement of the second shifting bar has to be introduced, is moved itself due to the first displacement introduced. Therefore, to maintain the desired accuracy, a combined introduction of the two displacements is preferred, notably by means of a coupling device which derives, without play, the extra displacement of the second shifting bar from the displacement of the first shifting bar. This can be achieved by means of a lever, which is connected to the first shifting bar, is controlled by it, and passes on the pivoting and/or shifting movement imparted to it to the second shifting bar in such a manner that the latter undergoes the wanted displacement for the linear shift. FIGS. 7 and 8 illustrate the use of a first type of lever for such a control device; FIG. 9 shows a second type.

FIG. 7 gives a schematic of a double bar parallelogram and its control device. To make comparison with FIG. 6 easier, the double bar parallelogram has been designated by the same reference numbers 80–86 as the double bar parallelogram first discussed with reference to FIG. 6. Lever 100 is connected by flexible hinge 101 to the fixed mass—like fixed bar 80—and is twice as long as the pivoting bars 82, 83, 84 or 85. Moreover, lever 100 is placed in such a manner that it is parallel to these pivoting bars and that its free end is connected via bar 102 to the hinge point between pivoting bar 85 and the second shifting bar 86. Furthermore, lever 100 is hinged, half-way its length, via bar 103, which is as long as bar 102, to the hinge point between pivoting bar 85 and the first shifting bar 81.

If now a displacement is introduced as indicated by arrow 87, bar 83 will assume the position 83′, which, like the other displaced positions, is indicated in dashed line. Also controlled by the second pivoting bar 82, the first shifting bar 81 will move leftwards and downwards to the position 81′. Due to this displacement, lever 100, controlled by bar 103, will pivot to position 100′. The movement of lever 100 causes, via bar 102, the bars 84 and 85 to move to positions 84′ and 85′, taking along shifting bar 86 to position 86′. The end of pivoting bar 85, which is connected to the second shifting 86, will, due to its coupling to the 1-to-2 lever 100, move approximately twice as much to the left, from its initial position, as the other end of pivoting bar 85, which controls the lever via bar 103, so that the desired displacement of bar 86 and, consequently, an almost linear shift is obtained. Exact calculations have shown that, with a pivoting-bar length of 30 mm, the deviation from the purely linear displacement amounts to $0.75 \times 10^{-7}$ mm on a shift of between 0 and 1 mm, so the accuracy is better than 1 to $10^{-7}$.

FIG. 8 represents an embodiment of the device of FIG. 7 obtained by providing an arrangement of slots and flexible hinges in a plate; to make comparison easier, the same reference numbers have been used. in the discussion of FIG. 7, the displacement introduced as indicated by arrow 87 was applied to pivoting bar 83 or to the first shifting bar 81, which yielded a double displacement of the second shifting bar 86. As small to very small desired displacements are concerned in this case, it is less favourable to obtain such a displacement by introducing a displacement of half its size. That is why, in te embodiment according to FIG. 8, the displacement introduced is applied, as indicated by arrow 88, to lever 100, so that the displacement introduced is equal to the displacement obtained. Furthermore, the displacement is introduced via a first-class lever 104 with coarse adjustment 105 and fine adjustment 106, as was discussed above in connection with FIG. 5.

FIG. 9 shows a second variant of a fine-adjusting device with a control lever. The double bar parallelogram is indicated by the reference numbers 80–86, as was the case in FIGS. 6–8. In this instance, a lever 110 has been provided, which is parallel to and as long as pivoting bars 82–85. Lever 110 has been designed as an equal-armed first-class lever, which is hinged on a fixed connecting part forming a whole with the first shifting bar 81. Further, one end of lever 110 has a hinged connection via bar 112 to the middle of pivoting bar 82, the other end being connected via bar 113 to the middle of pivoting bar 85.

When a displacement is applied as indicated by arrow 114, the first shifting bar is moved rightward and downward. The fulcrum of lever 110, which has a fixed connection to bar 81, undergoes the same displacement. As one end of bar 112 is connected to the middle of pivoting bar 82, this end and, consequently, also the other end of bar 112, lags behind the fulcrum, so that lever 110 begins to turn on its fulcrum, and, in consequence, te end hinged to bar 113 is displaced more than is caused by the shift of bar 81. The additional displacement of the hinge point between lever 110 and bar 113 is approximately equal to the reduction of displacement of the hinge point between lever 110 and bar 112. The latter displacement is caused by the clockwise pivoting movement of bar 82 through a certain angle upon its hinge point with the fixed mass. The control device 110-113 imparts this pivoting movement in the above-described manner to bar 85, which results in an anti-clockwise movement of bar 85 upon its hinge point with the first shifting bar 81, the angles through which bars 82 and 85 pivot being approximately equal due to the choice of the ratios and connecting points of the control device, so that the movement of the second shifting bar 86 is practially linear. Exact computations have shown that with a pivoting-bar length of 30 mm, the deviation from a purely linear movement is $10^{-4}$ mm on a displacement of 2 mm. With other ratios, particularly with longer levers, also in this embodiment, accuracies of $10^{-7}$ can be obtained. The embodiment shown, however, has a very compact construction, the lever being as long as the pivoting bars, so that the lever can be placed favourably between the first and the second bar parallelogram.

The linear fine-adjusting devices shown in FIGS. 7–9 provide an adjusting possibility in one direction. Two such devices can be combined into one X-Y adjusting device in the manner shown in FIG. 6. In such an arrangement, however, the adjusting control for the inner device would not be adjustable from the fixed mass, since it would be located on the second shifting bar of the outer device. Therefore, an arrangement as shown, by way of example, in FIG. 10, in which the X and the Y-coordinate can be adjusted, indipendently of each other, from the fixed mass, is to be preferred.

Figure 10:
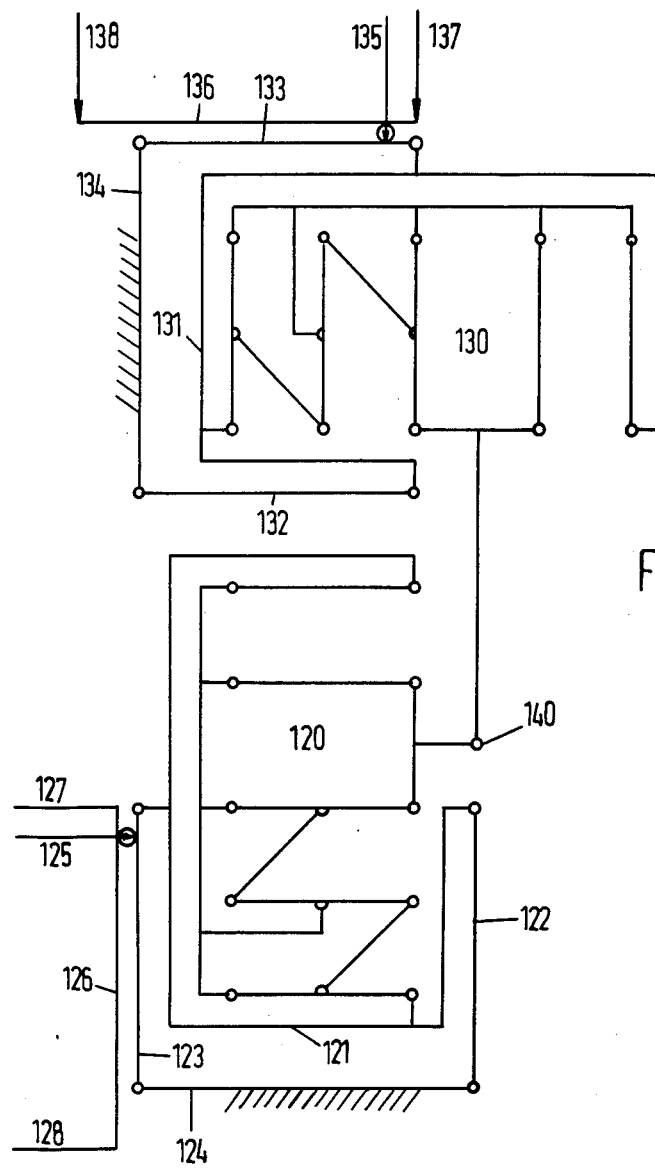
FIG. 10 is a schematic representation of a linear X-Y fine-adjusting device.

The linear X-Y fine-adjusting device shown in FIG. 10 comprises two devices as shown in, and described with reference to FIG. 9. In FIG. 10, these two devices are designated by general reference numbers 120 and 130 and are so arranged, relative to each other, that in the initial position shown in FIG. 10, the pivoting bars of device 130 are at right angles to those of device 120.

The fixed bars of the devices 120 and 130 are not connected to the fixed mass, but to shifting bars 121 and 131, respectively, of bar parallelograms further consisting of pivoting bars 122, 123 and 132, 133, respectively, and fixed bars 124, 134, respectively, which are connected to the fixed mass. The devices 120 and 130 are so arranged in relation to these bar parallelograms, that, in the initial position shown in FIG. 10, their pivoting bars are at right angles to the pivoting bars 122, 123 and 132, 133 respectively. The second shifting bar of device 120 is coupled via an adjusting element 140 to the second shifting bar of device 130.

The introduction of a displacement at point 125—point 135 being blocked—tends to move adjusting element 140 rightwards by the pivoting movement of parallelogram 121-124, and downwards due to the narrowing of the parallelogram. Device 130 allows displacement to the right, i.e. only a linear displacement, while shifting bar 131 remains in place; the adjusting element cannot move downwards. The downward movement of the shifting bar 121 attendant upon the pivoting of parallelogram 121-124 is balanced now, in so far as the adjusting element 140 is concerned, by a linear displacement of the second shifting bar of device 120, so that the displacement introduced at point 125 results in a linear displacement of adjusting element 140 in the same direction. In an analogous manner, a displacement introduced at point 135 is converted into a linear movement of adjusting element 140 in the same direction.

As has been observed earlier in regard of FIGS. 5 and 8, it is preferable to introduce the displacements via unequal-armed first-class levers 126 and 136 with coarse-adjusting points 127 and 137 and fine-adjusting points 128 and 138, respectively.

Figure 11:
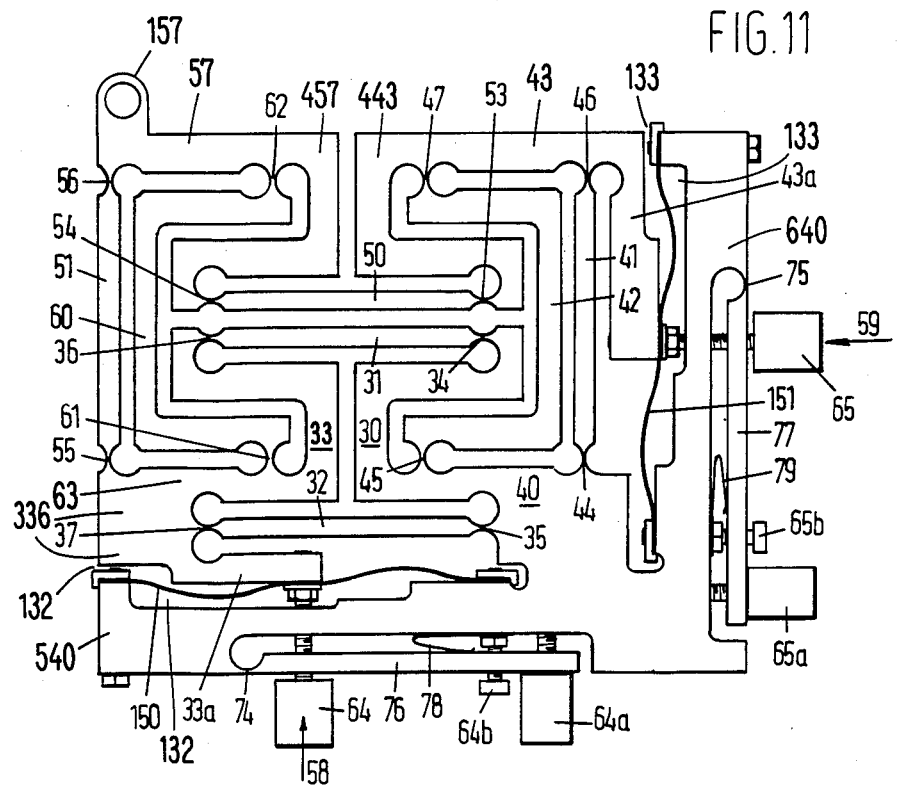
FIG. 11 shows a further design variant of the X-Y fine-adjusting device with elasticity-balancing springs.

A variant of the unequal-armed levers 126 and 136 is shown in FIG. 11, which represents an X-Y fine-adjusting device which is comparable with those of FIGS. 4 and 5; therefore, corresponding parts are designated by the same reference numbers. Angled extensions 443 and 457 respectively of bars 43 and 57 are necessary to support the hinges 53 and 54 in the configuration shown. Arms 30 and 33 are bracket-shaped in FIG. 11 and disposed "back to back" between arms 31 and 32. As is the case in FIG. 4, screws 64 and 65 act on shifting bars 33 and 43, respectively, though in this case via parts 33a and 43a, respectively, which are rigidly connected to these bars. Part 33a in this case is actually a rigid re-entrant right-angled extension of the bar 63, which, as already mentioned in connection with FIG. 3, is in turn a rigid right-angled extension of the bar 33. Screws 64 and 65 are coupled to parts 33a and 43a in such a manner that they can turn with respect to these parts, but cannot move in axial direction. Viewed from their respective points of application on parts 33a and 43a, screws 64 and 65 pass freely through parts which belong to the fixed mass or to the frame including the parts 30 and 40, such as the extensions 540 and 640, to which one-armed levers 76 and 77 are respectively connected by flexible hinges 74 and 75. Each of the levers 76 and 77 is provided, near the flexible hinges 74 and 75, respectively, with a threaded hole to receive screws 64 and 65, respectively. Near its free end, each of the levers 76 and 77 is provided with a hole which lets pass, with ample play, screw 64a, 65a, respectively, screwed into a threaded hole in the above-mentioned extension part 540,640 belonging to the fixed mass or to the frame. Springs 78 and 79 ensure that levers 75 and 76 always bear against the knobs of screws 64a and 65a, respectively. In order to prevent excessive displacements of levers 75 and 76, which may lead to a permanent deformation of flexible levers 74 and 75, stop screws 64b and 65b, respectively, have been provided.

In this embodiment, a coarse adjustment is carried out by turning screw 64 or 65. When screw 64 is turned to the right, lever 76 cannot react by pivoting downward, since it bears against screw 64a. As the lever is kept in place, the displacement of screw 64 with respect to lever 76 will result in a displacement of the screw with respect to the fixed mass or the frame and introduce a displacement into the X-Y fine-adjusting device. A displacement in opposite direction will take place if screw 64 is turned to the left, due to its coupling to part 33a and the resilience of the hinges of the device.

A fine adjustment is carried out by turning screw 64, thus causing lever 76 to pivot, taking along screw 64, though over a proportionately reduced distance. An opposite displacement is obtained by turning screw 64 to the left; in thsi case spring 78 helps to ensure that lever 76 continues to bear against screw 64a and to follow it.

If, starting from the position shown in FIG. 11, in which all the bars of the X-Y fine-adjusting device are in their neutral mid-position, screw 64 or 64a is turned to the left, an insufficient resilience of spring 78 as compared with the various elastic forces produced in the flexible hinges moved off their neutral mid-positions may lead to a spurious upward movement of lever 76, so that the wanted displacement is not or not completely obtained. In order to avoid this, springs 150 and 151 have been provided between parts 33a and 43a, respectively, and the parts belonging to the fixed mass or the frame. Springs 150 and 151 have a negative stiffness, i.e. they have an unstable equilibrium in their mid-position and, once pushed out of that mid-position, move to their utmost position with a force that is proportional to the deviation. Springs 150 and 151 are leaf springs each having, at either end, a fixed connection to the part belonging to the fixed mass or to the frame, notably at a distance between the ends which is smaller than the length of the spring in unloaded condition. In general, such a clamped-in spring will bulge. If now the middle part of the spring is clamped in and forcibly put in alignment with the two clamped-in ends, the middle of the clamped-in part lying half-way between the two clamped-in ends, an unstable equilibrium is obtained, which is used in this case; if the spring is moved out of its unstable equilibrium, it will tend to bulge with increasing force, as mentioned above.

Between the clamped-in parts, the leaf spring bulges. In the present embodiment, two bulges in opposite directions have been opted for, notably for space-saving reasons; bulges in the same direction are also possible. By a suitable dimensioning of springs 150 and 151—by a suitable choice of material, length, width, thickness and distance between clamped-in ends—the elastic forces produced in the flexible hinges of the X-Y fine-adjusting device by the pivoting action can be reduced or even entirely balanced, so that there need not be any fear of an unwanted movement of lever 76 or 77.

Apart from that, the compensation of elastic forces produced in the flexible hinges has some further advantages such as an almost forceless operation of the adjusting controls and a symmetrical loading of the hinges, so that they can be used from one utmost position to the other and the adjusting range of the device is maximized. Though the negative-stiffness spring has been shown in FIG. 11 and discussed with reference to that figure, it can be used in all other fine-adjusting devices according to the invention, in order to secure the extra advantages just mentioned.

It is obvious that, within the framework of the invention, many other modifications and variants as well as other combinations than those dealt with above and represented in the figures are possible. For example, in the embodiment according to FIG. 1, an inner parallelogram rotated through 90 degrees, can be provided in plate part 23. It should also be noted that samll deviations caused by the pivoting movement of the parallelograms are smallest directly at the left and at the right of the vertical position of the pivoting bars with respect to the fixed bar, so that it may be favourable to take as initial state of the pivoting bars, instead of the perpendicular position, a position rotated from the perpendicular against the movement to be carried out. A further possibility consists in incorporating a plate provided with an X-Y fine-adjusting device in a frame that can be displaced in the Z-direction by means of a further fine-adjusting device.

We claim:

1. A fine-adjusting device for positioning a work piece in two dimensions defined by a plane surface of a metal plate, which device is capable of having its principal structure formed from a metal plate having apertures cut out therein, at least part of which apertures are slots, and accordingly comprises a slotted and apertured metal plate, wherein:

a first four-hinged frame is formed of a first pair of parallel flat bars (31, 32) having the same length measured in a straight line between the extremities of a said bar, said bars both being reduced in width at both extremities by semi-circular cutouts oppositely located on opposite bar sides forming flexure hinges (34, 36; 35, 37) connecting said first pair of flat bars to a second pair of flat bars (30, 33) which are of equal length measured between said flexure hinge connections, a first said bar (30) of said second pair being in fixed position and a second bar (33) of said second pair having at one end thereof a first rigid end extension (63) at right angles to the bar and extending towards said first bar (30) of said second pair, said first bar (30) of said second pair having a first right-angled rigid extension (40) extending towards but short of said right-angled extension (63) of said second bar of said second pair and also having a second right-angled extension (131) extending in the same direction as said first right-angled extension (40) thereof at a location such as to leave a first variable slot (132) between the end of said second extension (131) and the adjacent end of said second bar (33) of said second pair, which slot (132) extends parallel to said second right-angled extension (131) of said first bar (30) of said second pair to the vicinity of a hinge (35) connecting said first bar (30) of said second pair to a first bar (32) of said first pair, the latter bar (30) having also a straight end extension (134), an aperture being formed internally of said first four-hinged frame which aperture includes four of said semicircular cutouts located on facing sides of said bars of said first pair;

a second four-hinged frame is formed of first and second pairs of bars, said first pair of flat bars (40, 43) being straight, parallel and of equal length between hinges (44, 45; 46, 47) of said second frame connecting said first pair of bars to said second pair (41, 42) of bars in said second frame, a first bar (40) of said first pair of bars in said second frame being constituted by said first rigid extension of said first bar (30) of said second pair of said first frame for being rigidly connected to the latter bar, the bars of said second pair of bars (41, 42) in said second frame being constituted so as to maintain pairs (44, 46; 45, 47) of said hinges of said second frame always at equal distance separating the hinges of each hinge pair, each said hinge pair being composed of one hinge connecting to each of said bars of said first pair of said second frame, said hinges being formed by semicircular cutouts of both sides of end extensions of said bars of said second pair in said second frame, the second bar (43) of said first pair in said second frame having a right angled extension (143) extending away from the first bar of the same pair at the end of said second bar (43) of said first pair in said second frame which is nearer to said straight extension (134) of said first bar (30) of said second pair in said first frame, leaving an opening of a second variable slot (133) between said right-angled extension (143) of said second bar (43) of said first pair of said second frame and said straight end extension (134) of said first bar of said second pair in said first frame, said second variable slot (133) running along said straight end extension of said first bar of said second pair in said first frame to a semicircular cutout of a said flexure hinge (44) connecting said first bar (40) of said first pair in said second frame to a bar (41) of said second pair in said second frame;

a third four-hinged frame formed of a first pair of flat bars (57, 63) which are straight, parallel and of equal length between hinges (55, 61; 56, 62) of said third frame, of which pair of first said bar (63) is constituted by said right-angled end extension of said second bar (33) of said second pair in said first frame and the second bar (57) is equipped with a holder (157) rigidly attached thereto for holding an article to be positioned, said third frame having a second pair of flat bars (51, 60) constituted so as to maintain pairs (55, 56; 61, 62) of said hinges of said third frame always at equal distance separating the hinges of each pair, each said pair being composed of one hinge connecting to each said bars of said first pair of said third frame, said hinges being formed by semicircular cutouts on both sides of end extensions of said bars of said second pair of said third frame;

a coupling link flat bar (50) having a flexure hinges (53, 54) at its ends each having semicircular cutouts on both sides of the hinge portion of the bar, including a first hinge (53) connecting said link bar (50) to said right-angled end extension (143) of said second bar of said first pair in said second frame and a second hinge (54) connecting said link bar (50) to a right angled end extension (257) of said second bar of said first pair in said third frame, said link bar (50) being of a length equal to a length of the bar (31, 32) of said first pair in said first frame, and means for independently varying the respective widths of said first and second variable-width slots, including first adjusting means mounted on said second right-angled extension (131) of said first bar of said second bar pair in said first frame and second adjusting means mounted on said straight extension (134) of said first bar of said second bar pair in said first frame, whereby said holder (157) may be positioned in two dimensions in a plane by actuation of said first and second adjusting means.

2. A device according to claim 1, wherein said first and second adjusting means each consists of a screw-type adjustment mechanism (64, 65) for varying the width of the respective variable width slots.

3. A device according to claim 1, wherein said holder (157) is attached to the same end of said second bar (57) of said first pair in said third frame at which said right-angled extension (257) is provided for said bar for holding a connecting hinge (54) for one end of said link bar (50).

4. A device according to claim 1, wherein said flat link bar and all said flat bars of said first, second and third frames are straight and are bounded on one side, for at least the predominant part of the length of the bar, by a deformable slot, said deformable slots including said first and second variable width slots.

5. A device according to claim 1, wherein said first and second variable width slots are wide enough to accommodate and are in part occupied by first and second pivoted unequal-arm levers (68, 69) respectively forming part of said first and second adjustment means and having fulcrums hinged by respective flexure hinges (66, 67) to said first and second hinged frames, said first lever (68) being located in said first variable width slot and being hinged at its fulcrum to an end of the first bar (32) of said first pair in said first frame at a position adjacent to the said hinge (37) which connects said first bar (32) of said first pair to said second bar (33) of said second pair in said first frame, and said second lever (69) being hinged at its fulcrum to an end of the first bar (41) of said second pair in said second frame adjacent to the hinge (46) connecting said first bar (41) of said second pair to said second bar (43) of said second pair in said second frame, said hinges (66, 67) of said first and second levers being constituted in the same manner as the several hinges of said frames, said levers each having a short arm extending from said hinge, upon which said bar is mounted and pivoted, to the open end of the said variable-width slot in which it is located and a long arm extending from said last-mentioned hinge almost to the closed end of the slot in which it is located, said first and second adjusting means including in each case coarse adjustment means acting on the said short end of said lever and a fine adjustment for acting on the long arm of said lever.

6. A device according to claim 1, wherein in which that one of said bars of said second pair in said second frame which is connected by a hinge (45) to the end of said first right-angled extension of said first bar (30) of said second pair in said first frame, which extension constitutes said first bar (40) of said first pair in said second frame, and also that one (60) of said second pair of flat bars in said third frame which is connected by a said hinge (61) to the end of said right-angled extension of said second bar (33) of said second pair in said first frame which constitutes said first bar (63) of said first pair of bars in said third frame, are both of bracket shape for providing an aperture rather than a slot between them, and wherein said holder (157) is mounted on a right-angled end extension (357) of said second bar (57) of said first pair in said third frame extending into said aperture.

7. A device according to claim 6, wherein said link bar (50) and all other bars of said frames except said bracket-shape bars are straight bars.

* * * * *